United States Patent [19]

McKeown

[11] 4,041,113

[45] Aug. 9, 1977

[54] TOWER PACKING ELEMENTS

[75] Inventor: Kevin Joseph McKeown, Windermere Westmoreland, England

[73] Assignee: Mass Transfer Limited, Kendal, England

[21] Appl. No.: 702,008

[22] Filed: July 2, 1976

Related U.S. Application Data

[63] Continuation of Ser. No. 474,322, May 29, 1974, abandoned.

[30] Foreign Application Priority Data

May 30, 1973 United Kingdom ............... 25791/73
Aug. 31, 1973 United Kingdom ............... 41146/73

[51] Int. Cl.² ............................................. B01F 3/04
[52] U.S. Cl. ..................................... 261/98; 210/150; 261/DIG. 72
[58] Field of Search ..................................... 261/94–98, 261/108, DIG. 72; 202/158; 210/150, 151, 17, 23; 55/233

[56] References Cited

U.S. PATENT DOCUMENTS

| | | | |
|---|---|---|---|
| 1,796,501 | 3/1931 | Berl | 261/DIG. 72 |
| 2,602,651 | 7/1952 | Cannon | 261/95 |
| 2,834,466 | 5/1958 | Hament | 261/95 X |
| 3,151,187 | 9/1964 | Comte | 261/98 X |
| 3,167,600 | 1/1965 | Worman | 261/95 X |
| 3,266,787 | 8/1966 | Eckert | 261/DIG. 72 |
| 3,311,356 | 3/1967 | Eckert | 261/94 |
| 3,365,180 | 1/1968 | Lerner | 261/DIG. 72 |
| 3,543,937 | 12/1970 | Choun | 261/DIG. 72 |
| 3,914,351 | 10/1975 | McKeown et al. | 261/DIG. 72 |
| 3,957,931 | 5/1976 | Ellis et al. | 261/DIG. 72 |

FOREIGN PATENT DOCUMENTS 917,906 2/1963 United Kingdom ................... 261/94

*Primary Examiner*—Tim R. Miles
*Assistant Examiner*—Richard L. Chiesa
*Attorney, Agent, or Firm*—Wigman & Cohen

[57] ABSTRACT

Packing elements for fluid-fluid contact apparatus comprising a pair of oppositely curved strip members connected together at their ends so that the two curved members have generally parallel non-coincident planes of curvature. The curved strip members should be "under square" as is also, preferably, the whole packing element.

5 Claims, 7 Drawing Figures

TOWER PACKING ELEMENTS

This is a continuation, of application Ser. No. 474,322 filed May 29, 1974, now abandoned.

This invention is concerned with fluid-fluid contact apparatus of the packed tower type and packing elements therefor.

Fluid-fluid contacts apparatus of the packed tower type for effecting mutual gas (vapour)/liquid and liquid/liquid contact is well known and, basically, comprises a tower or other structure containing one or more beds of packing elements and having means for introducing the fluids to be brought into contact with each other into said bed(s). In many applications, the fluids are brought into contact in countercurrent flow, the more dense fluid (i.e. the liquid in the case of gas(-vapour) liquid contact apparatus)flowing downwardly through the packed bed whilst the less dense fluid (i.e. the gas or vapour in the case of gas (vapour)/liquid contact apparatus) flows upwardly through the bed. In other applications (e.g. crossflow cooling towers) the fluid flows are usually at right angles to each other, for example with a liquid flowing downwardly through the bed whilst a gas or vapour flows across the bed. It is not necessary that both fluids be forcedly fed to the beds and thus, for example, in the case of the sewage trickling filter liquid effluent is irrigated onto the surface of a packed bed through which air is allowed to permeate (usually without forced flow) to permit aerobic biological treatment fo the effluent. The present invention is concerned with all apparatus in which two different fluids are brought together in packed bed for some action between them and packing elements for use in such packed beds.

A wide variety of packing elements are known for such apparatus, for example fabricated packing such as Raschig rings, Berl saddles, Intalox saddles and Pall rings wherein the beds may be stacked beds (i.e. beds in which at least a portion of the elements have been placed in situ in the apparatus). In the case of saddles the beds will almost always be dumped beds.

The nature of the packing will, of course, affect the performance of the apparatus and it is an object of the present invention to provide improved packing elements for use in fluid/fluid contact apparatus (especially of the dumped bed type) and fluid/fluid contact apparatus packed therewith.

Basically, the packing elements of the invention comprise a pair of oppositely curved strip members connected together at their ends so that the two curved members have generally parallel non-coincident planes of curvature. In other words, as seen most clearly in FIGS. 1—3, the strip members are oppositely curved with respect to a diametric symmetry plane, each of said strip members being on opposite sides of a parting plane which extends perpendicular to the symmetry plane and divides the packing element into two equal sections.

For a better understanding of the invention reference will now be made to the accompanying drawings in which.

Figure 2:
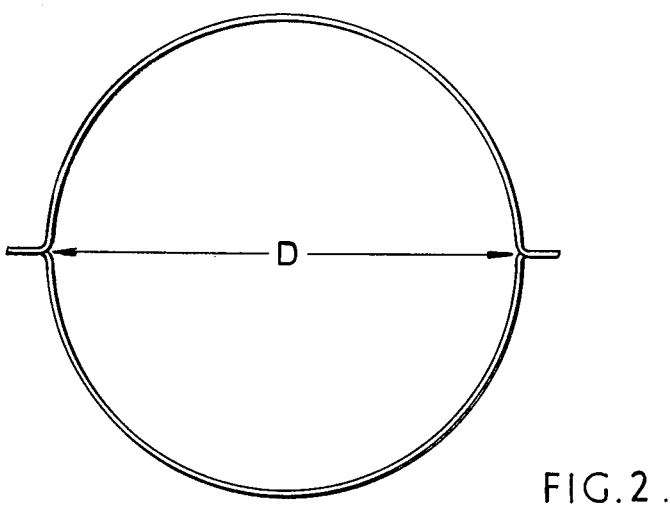
FIG. 2 is a plan view of the element shown in FIG. 1.

The curved strip elements forming the packing elements in accordance with the invention generally have an approximately circular curvature and will conveniently be approximately semi-circular when viewed in plan (FIG. 2) to give an element having a generally circular cross section as viewed in plan (FIG. 2). Whilst this circular configuration is generally preferred it will, of course, be understood that the packing elements of the invention may take any closed curve as viewed in plan and this may include re-entrants and, further, need not be smooth continuous curve but may be made up of a number of straight portions linked by curved or angled portions. For convenience, however, the elements illustrated have a generally circular cross section (as viewed in plan) and it will be understood that for most purposes this will be the preferred configuration. Thus, the packing elements of the invention may be regarded as being derived from tubular elements of the devised cross-section by slitting the element along a transverse median line and axially displacing the two halves with respect to each other.

The two curved members of the packing elements of the invention will generally be linked by straight post like members and, indeed, in the case of those elements formed from metal this will almost certainly be a consequence of their manufacture. Thus metallic elements in accordance with the invention can be prepared from sheet metal by forming a slit along one principal axis of a generally rectangular metal plate and bending the two parts or limbs of the plate separated by the slit in a direction normal to the plane of the plate. In the case of packing elements of the invention manufactured, for example, from plastics or ceramic material the portion linking the two curved elements generally take the form of a post of, for example, circular or rectangular cross section.

It is an important features of the packing elements of the present invention that each curved member forming the element shall be "undersquare", that is the "diameter" of the element shall be greater than its "width". The term "diameter" is intended to refer to the maximum dimension of the curved strip member in its plane of curvature (D in FIG. 2) and the term "width" is intended to refer to the maximum linear dimension of the strip in a plane normal to the plane of curvature (W in FIG. 3). Preferably the ratio of diameter to width of each individual member is greater than 1.5:1 but less than 10:1 and is advantageously in the range of 2:1–5:1 and particularly in the range of 2:1–4:1. Further, it is preferred that the whole packing element (composed of the two curved strip members) be "undersquare", that is that its "diameter" (i.e. its maximum transverse direction as viewed in plan) be greater than its "width" (i.e. its greater linear dimension in a plane normal to the planes of curvature of the curved strip elements; (W' in FIG. 3).

Figure 1:
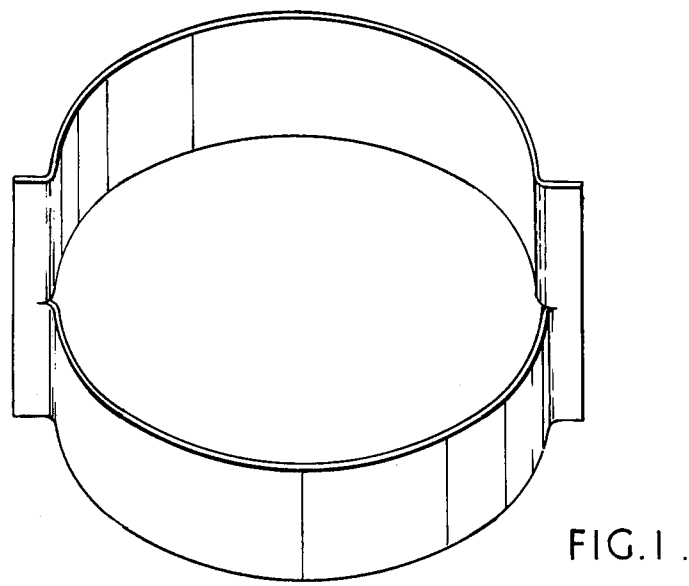
FIG. 1 is a perspective view of a basic packing element in accordance with the invention.
Figure 3:
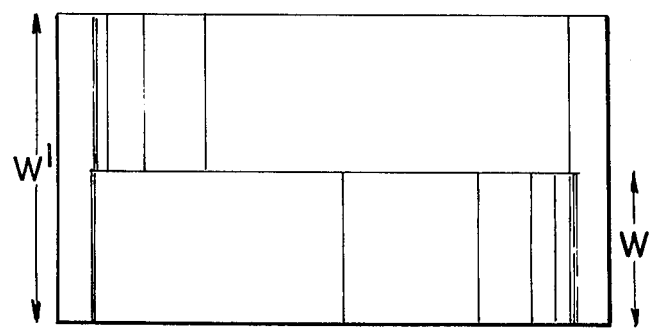
FIG. 3 is a side elevation of the element shown in FIG. 1.

As will be appreciated, it is simplest form, the packing elements in accordance with the invention comprise two plain oppositely curved strip members connected together and such an element (having a generally circular cross section as viewed in plan) is illustrated in FIGS. 1-3 of the drawings.

The present invention also encompases modified elements wherein the basic curved strip members have been modified in some way or other.

Figure 4:
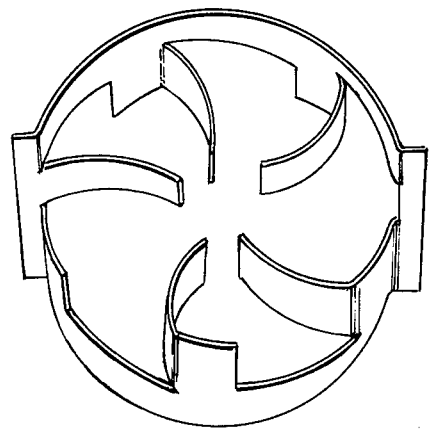
FIG. 4 is a perspective view of a tabbed packing element in accordance with the invention.
Figure 5:
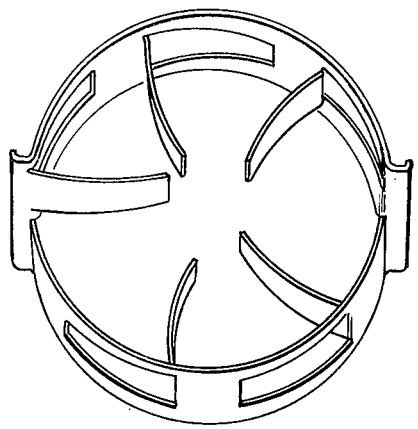
FIG. 5 is a perspective view of a tabbed and apertured packing element in accordance with the invention.
Figure 6:
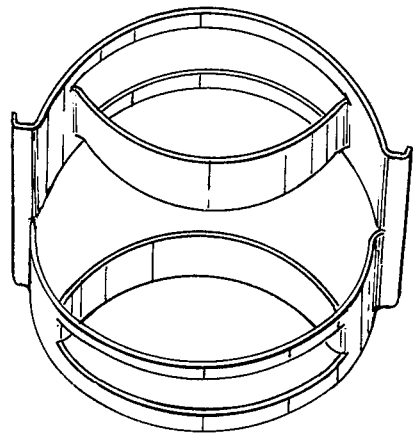
FIG. 6 is a perspective view of a ribbed element in accordance with the invention.
Figure 7:
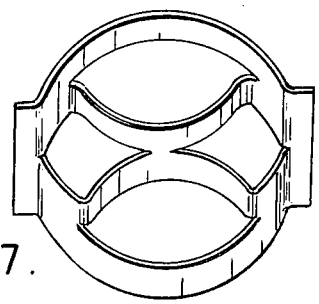
FIG. 7 is a perspective view of another ribbed element in accordance with the invention.

Thus, for example, the curved strips may be provided with inwardly directed tabs (see FIG. 4) which, in the case of the packing elements in accordance with the invention derived from sheet metal strip will spring from recesses in the strip wall (FIG. 4). Alternatively, the curved strip members may be perforated (FIGS. 5 and 6) and, in this case, the packing elements formed from metallic strips will generally have tabs or ribs extending from the apertures. (FIGS. 5 and 6). Such tabs or ribs or other projections from the ring surface serve to prevent "nesting" of the rings when they are dumped in a bed. Additionally, as explained more fully in U.S. Pat. No. 3,957,931 assigned to the assignee of this invention, the projections, by preventing nesting, further facilitate in cooperation with the aforementioned diameter to width ratio a generally horizontal alignment of the packing elements when dumped in a bed.

The packing elements in accordance with the invention lend themselves particularly well to manufacture from sheet or strip metal in the manner described above. Whilst the formation of the elements is described above as a two step process it will, of course be appreciated that, in practice, the slitting and punching operations will generally be effected on the same machine and hence may be regarded as taking place almost simultaneously. It is not necessary that the plates be formed separately before being slit and punched into the desired form but, the whole element may be formed on one machine from a continuous tape or ribbon of metal.

The nature of the metal used to form the elements of the invention will, of course, depend upon the intended use of the elements and hence more or less chemically resistant metals, e.g. stainless steel or mild steel may be used depending upon the final intended application.

As indicated above, however, it is not always necessary that the packing elements in accordance with the invention be formed from metal and, indeed, they may be formed from plastics material (for example by an injection moulding process) or may be formed of ceramics. In these cases (and particularly in the case of ceramics) the walls of the elements will be generally thicker than shown in the accompanying drawings which are generally illustrative of packing elements formed from sheet metal. Again, however, the elements in accordance with the invention formed of plastics or ceramics may have apertured side walls and may have ribs or tabs extending inwardly or outwardly from the side walls.

The invention also provides fluid-fluid contact apparatus comprising a packed bed and means for introducing fluids to said bed for contact therein, in which at least a part of the bed is a bed formed of packing members in accordance with the invention.

The apparatus of the invention may take any of the forms in which packed beds and elements are utilised to effect fluid-fluid contact; for example, they may take the form of absorption, desorption, water cooling, biological treatment, gas-humidification, distillation or liquid-liquid extraction apparatus.

The bed of packing elements within the apparatus may be simply prepared by dumping the elements into the bed(s). Where the apparatus is of the cross flow type it may be advisable to turn the elements in the beds through 90° and this may be achieved by physically turning the bed on a simple support or by flooding the apparatus.

I claim:

1. Fluid-fluid contact apparatus comprising a packed bed and means for introducing fluids to said bed for contact therein in which at least a part of the bed is a dumped bed formed of packing elements each comprising a tubular member of given diameter and width having two strip portions oppositely curved with respect to a diametric symmetry plane, the ratio of the diameter of said tubular member to its width being from 2:1 - 5:1, each of said strip portions being on opposite sides of a parting plane which extends perpendicular to said symmetry plane and divides said tubular member into two equal sections, and wherein each of said strip portions includes a single additional strip portion having no free ends and being oppositely curved with respect thereto as well as oppositely curved with respect to each other, said additional strip portions extending inwardly from the inside wall of said tubular member leaving apertures therein and providing protrusions which prevent nesting of said packing elements and thus facilitate, in cooperation with said diameter to width ratio, a generally horizontal alignment of said elements with respect to one another in said bed.

2. Apparatus according to claim 1, wherein the curved strip portions are of approximately semi-circular configuration when viewed in plan.

3. Apparatus according to claim 1, wherein the two curved strip portions are linked by straight post-like members.

4. Apparatus as defined in claim 1, wherein said additional strip portions are axially spaced from one another.

5. Apparatus as defined in claim 1, wherein said additional strip portions are connected to one another.

* * * * *